United States Patent
Gruber et al.

[11] Patent Number: 5,330,841
[45] Date of Patent: Jul. 19, 1994

[54] AQUEOUS COATING COMPOSITION AND ITS USE FOR COATING MINERAL SUBSTRATES

[75] Inventors: Hermann Gruber; Helmut Reiff, both of Leverkusen; Hermann Kober, Bergisch Gladbach, all of Fed. Rep. of Germany

[73] Assignee: Bayer Aktiengesellschaft, Leverkusen, Fed. Rep. of Germany

[21] Appl. No.: 891,535

[22] Filed: Jun. 1, 1992

[30] Foreign Application Priority Data

Jun. 4, 1991 [DE] Fed. Rep. of Germany ....... 4118231

[51] Int. Cl.⁵ .................. B32B 27/00; C08J 3/00; C08K 3/18; C08L 75/00
[52] U.S. Cl. .................. 428/425.5; 524/433; 524/591
[58] Field of Search .................. 524/591, 433; 428/425.5

[56] References Cited

U.S. PATENT DOCUMENTS

| | | | |
|---|---|---|---|
| 4,408,008 | 10/1983 | Markusch | 524/591 |
| 4,608,416 | 8/1986 | Schupp et al. | 524/591 |
| 4,609,572 | 9/1986 | Gruber et al. | 427/385.5 |
| 4,663,377 | 5/1987 | Hombach et al. | 524/196 |
| 4,857,368 | 8/1989 | Klein | 428/425.5 |
| 5,075,370 | 12/1991 | Kubitza et al. | 524/591 |

FOREIGN PATENT DOCUMENTS

| | | |
|---|---|---|
| 013112 | 7/1980 | European Pat. Off. . |
| 383492 | 8/1990 | European Pat. Off. . |
| 2507884 | 9/1976 | Fed. Rep. of Germany . |
| 1530021 | 10/1978 | United Kingdom . |

*Primary Examiner*—Paul R. Michl
*Assistant Examiner*—Patrick Niland
*Attorney, Agent, or Firm*—Joseph C. Gil; Thomas W. Roy

[57] ABSTRACT

The present invention relates to a coating composition which contains

A) 100 parts by weight of a water-soluble polyether component having an average hydroxyl functionality of least 2.5 and an average OH number of 100 to 600 and containing at least one polyether polyol, B) 40 to 240 parts by weight of a water-soluble or water-dispersible polyisocyanate component containing at least one nonionically/hydrophilically modified organic polyisocyanate having (cyclo)aliphatically bound isocyanate groups, C) 10 to 50 parts by weight magnesium oxide and/or hydroxide in finely dispersed form and D) 50 to 150 parts by weight water.

The present invention also relates to mineral substrates coated with this coating composition.

13 Claims, No Drawings

AQUEOUS COATING COMPOSITION AND ITS USE FOR COATING MINERAL SUBSTRATES

BACKGROUND OF THE INVENTION

1. Field of the Invention

The present invention relates to a new aqueous coating composition based on organic polyhydroxyl compounds and organic polyisocyanates containing free isocyanate groups and to the use of this coating composition for coating mineral substrates.

2. Background of the Invention

Reducing the organic solvent content of lacquers and coating compositions is a current problem for ecological and industrial hygiene reasons. Accordingly, the replacement of organic solvents by water is of considerable importance in modern coating technology.

Known aqueous two-component polyurethane lacquers contain blocked polyisocyanates because it has previously been assumed that polyisocyanates containing free isocyanate groups would not be useable in lacquer systems of the type in question because it would be expected that the polyisocyanates would react with the large excess of water and would not selectively react with the organic polyhydroxyl compounds that are always present as the main binder component of such coating compositions.

Aqueous lacquers based on blocked polyisocyanates are described, for example, in DE-OS 2,507,842 or 2,507,884. The systems according to DE-OS 3,829,587 are an exception to the rule mentioned. The aqueous lacquers described in this publication are in fact lacquers which, in addition to organic polyhydroxyl compounds, contain polyisocyanates containing free isocyanate groups. The selective reaction of the polyisocyanates with the organic polyhydroxyl compounds in the presence of a large excess of water is attributable to the very special nature of these polyhydroxyl compounds.

A completely new aqueous coating composition based on organic polyisocyanates and organic polyhydroxyl compounds has now surprisingly been found, containing water-soluble polyether polyols, nonionically hydrophilically modified polyisocyanates and magnesium oxide or hydroxide as its principal binder components. The coating composition according to the invention, which is described in more detail hereinafter, is particularly suitable for coating mineral substrates, such as masonry, concrete, gypsum and the like.

SUMMARY OF THE INVENTION

The present invention relates to a coating composition which contains

A) 100 parts by weight of a water-soluble polyether component having an average hydroxyl functionality of least 2.5 and an average OH number of 100 to 600 and containing at least one polyether polyol,
B) 40 to 240 parts by weight of a water-soluble or water-dispersible polyisocyanate component containing at least one nonionically/hydrophilically modified organic polyisocyanate having (cyclo)aliphatically bound isocyanate groups,
C) 10 to 50 parts by weight magnesium oxide and/or hydroxide in finely dispersed form and
D) 50 to 150 parts by weight water.

The present invention also relates to mineral substrates coated with this coating composition.

DETAILED DESCRIPTION OF THE INVENTION

The coating compositions according to the invention contain, per 100 parts by weight component A), 40 to 240, preferably 100 to 200 parts by weight of component B); 10 to 50, preferably 20 to 30 parts by weight of component C); 50 to 150, preferably 100 to 120 parts by weight of component D); and, optionally, the auxiliaries and additives typically used in the lacquer technologically.

Component A) is a polyether component having an average hydroxyl functionality of at least 2.5, preferably 2.5 to 5, and an OH number of 100 to 600, preferably 300 to 500, and containing at least one polyether polyol.

The polyether polyols of component A) are preferably propoxylation products of suitable starter molecules or mixtures of suitable starter molecules such as trimethylol propane, triethanolamine, sugar/ethylene glycol, ethylenediamine, sorbitol/glycerol or sorbitol/propylene glycol. The average hydroxyl functionality of the starter molecules or mixtures thereof approximately correspond to the hydroxyl functionality of the resulting polyether polyols, i.e., the functionality of the starters is selected to provide the desired functionality of the polyether polyol. Due to their high hydroxyl group content and comparatively low molecular weight, the propoxylation products mentioned by way of example are water-soluble polyether polyols which do not require any further hydrophilicity to provide solubility in water. However, it is also possible in principle to use hydrophilically modified polyether polyols, particularly those which have been produced using ethylene oxide instead of or in addition to propylene oxide.

The method used to produce the polyether polyols is not critical to the present invention, but rather the functionality and OH number mentioned above, Component B) is selected from nonionically/hydrophilically modified polyisocyanates having an average NCO functionality of 2.0 to 3.5 such as those described in DE-OS 3,521,618 (U.S. Pat. No. 4,663,377, herein incorporated by reference). In a preferred embodiment, component B) is selected from reaction products of (i) monohydric or polyhydric polyalkylene ether alcohols containing at least one polyether chain bearing at least 10 ethylene oxide units with (ii) isocyanurate-modified polyisocyanates prepared from monomeric diisocyanates such as 1,6-diisocyanatohexane and/or 1-isocyanato-3,3,5-trimethyl-5-isocyanatomethyl cyclohexane; uretdione diisocyanates prepared from these monomeric diisocyanates; urethane and/or allophanate-modified polyisocyanates prepared from these monomeric diisocyanates; biuret-modified polyisocyanates prepared from 1,6-diisocyanatohexane; bis-(6-isocyanatohexyl)oxadiazine trione; and mixtures of these polyisocyanates.

Alkoxylation products of monohydric $C_{1-6}$ alcohols such as methanol, ethanol, n-butanol or n-hexanol, which have a molecular weight of 480 to 2,480 and have been produced using ethylene oxide, optionally in admixture with up to 50% by weight, based on mixture, of propylene oxide as the alkylene oxides, are preferably used as the polyether alcohols (i) for the hydrophilic modification. The hydrophilically modified polyisocyanates of component B) generally have a free isocyanate group content of 5 to 25% by weight.

In addition, in the context of the foregoing disclosure, the quantity in which component B) is used is preferably selected so that the NCO:OH equivalent ratio, based on the isocyanate groups of component B) and the hydroxyl groups of component A), is 0.8:1 to 2:1, preferably 1:1 to 1.8:1.

Component C) is magnesium oxide or magnesium hydroxide, preferably magnesium oxide, in finely dispersed form.

Component D) is water.

The auxiliaries and additives E) which may optionally be used include pigments such as titanium dioxide, iron oxide red and chromium oxide;

catalysts for the NCO/OH reaction such as dibutyl tin dilaurate, dibutyl tin maleate and tin (II) octoate;

flow control agents such as butyl diglycol, N-methyl pyrrolidone and water-dilutable compounds with high boiler points;

external emulsifiers such as nonylphenol ethoxylates and, 3-benzyl-4-hydroxydiphenyl polyglycol ether; and fillers such as montmorillonite, calcium carbonate, alumosilicates, talcum and barium sulfate.

The ready-to-use coating composition is preferably produced by finely dispersing (or where soluble auxiliaries and additives E) are used, dissolving) component C) and the auxiliaries and additives E) optionally used in component A) and then combining the dispersion or solution with polyisocyanate component B). The resulting mixture may then be stirred with the water D) to form the ready-to-use aqueous coating composition. The coating compositions according to the invention produced in this way generally have a pot life of up to 6 hours. They are applied by known coating methods such as spread coating, roll coating or spray coating.

Suitable substrates include mineral substrates of the type previously described. The moisture often encountered in these substrates does not affect the coating process because of the aqueous character of the coating compositions according to the invention. Other substrates include PVC, bitumen board, wood and polystyrene foams. Light-stable coatings which are highly resistant to chemicals and abrasion are obtained in the form of unpigmented sealing coatings or pigmented lacquers. The coatings are best pigmented with preformed pigment pastes which may be used as component E) or as part of component E).

In the following examples, all percentages are by weight, unless otherwise indicated.

EXAMPLES

Starting materials

Polyhydroxyl compounds A

A1: Propoxylation product of trimethylol propane: OH number 380

A2: Propoxylation product of a mixture of sorbitol and glycerol: OH number 450, hydroxyl functionality 4.6

A3: Propoxylation product of a mixture of sorbitol and propylene glycol: OH number 480, functionality 4.5.

Polyisocyanates B

B1: 80.8 g of a polyether alcohol (having a molecular weight of 1,145 and prepared by the ethoxylation of n-butanol) was heated to 50° C. and added with stirring to 1,000 g of an isocyanurate-modified polyisocyanate (having an NCO content of 21.6%, an average NCO functionality of 3.3 and prepared by the catalytic trimerization of 1,6-diisocyanatohexane with subsequent removal of the unreacted excess starting diisocyanate to a residual content of 0.3%). The mixture was then heated to 110° C. and kept at that temperature for 2.5 h. After cooling a clear, yellow, water-dispersible resin was obtained which had an NCO content of 18.4% and a viscosity at 23° C. of 2,500 mPa.s.

B2: 40 g of a polyether alcohol (having a molecular weight of 1210 and prepared by the ethoxylation of 3-ethyl-3-hydroxymethyl oxetane) were added with stirring at room temperature to 500 g of the starting polyisocyanate used in B1, followed by stirring for 2 h at 100° C. A clear, yellow, water-dispersible polyisocyanate resin was obtained which had an NCO content of 19.0% and a viscosity at 23° C. of 2,600 mPa.s.

B3: A polyisocyanate resin having an NCO content of 19.7% and a viscosity at 23° C. of 3,200 mPa.s was obtained by the same procedure as in B2 with the exception that only 26.3 g of polyether alcohol was per 500 g starting polyisocyanate.

B4: A polyisocyanate preparation having an NCO content of 19.6% by weight and a viscosity at 26° C. of 1,600 mPa.s was obtained as in B1 from 95 parts by weight of the starting polyisocyanate used in B1 and 5 parts by weight of a polyether alcohol (having a molecular weight of 740 and prepared by the ethoxylation of ethylene glycol monomethyl ether).

B5: A polyisocyanate preparation having an NCO content of 19.2% and a viscosity at 23° C. of 2,900 mPa.s was obtained as in B1 from 90 parts by weight of the starting polyisocyanate used in B1 and 10 parts of a polyether alcohol, molecular weight 2,150, prepared by alkoxylation of n-butanol using a mixture of ethylene oxide and propylene oxide in a ratio by weight of 80:20.

B6: A polyisocyanate resin having an NCO content of 19.2% and a viscosity at 23° C. of 200 mPa.s was obtained as in B1 from (i) 90 parts by weight of a mixture of dimeric and trimeric 1,6-diisocyanatohexane which essentially contains a mixture of bis-(6-isocyanatohexyl)-uretdione and tris-(6-isocyanatohexyl)-isocyanurate and which has a viscosity at 23° C. of 150 mPa.s, an NCO content of 21.6% and an average NCO functionality of 2.6, and (ii) 10 parts by weight of a monohydric polyether alcohol (having a molecular weight of 1,210 and prepared by the ethoxylation of 3-ethyl-3-hydroxymethyl oxetone.

B7: A polyisocyanate resin having an NCO content of 19.5% and a viscosity at 23° C. of 220 mPa.s was obtained as in B1 from 92.5 parts by weight of the starting polyisocyanate used in B6 and 7.5 parts by weight of the polyether alcohol used in B1.

EXAMPLE 1

16.7 parts by weight of magnesium oxide having an average particle diameter of approx. 30 μm were finely dispersed in 83.3 parts by weight of polyether polyol A1. The resulting preparation had a hydroxyl group content of 9.6% and a viscosity at 23° C. of 1,500 mPa.s.

26.7 parts by weight of this magnesium-oxide-containing polyol preparation were stirred with 16.7 parts by weight of a gray pigment paste (commercially available pigment paste containing titanium dioxide, iron oxide red and chromium oxide green dispersed in water), 3.3 parts by weight of a 10% solution in butyl diglycol acetate of dioctyl tin (IV) maleate, 20.0 parts by weight water and 33.3 parts by weight of polyisocyanate resin B2 to form a coating composition according to the invention.

The coating material thus obtained had a high solids content of 72% and a viscosity (DIN 4 cup) of 180 seconds. The coating composition may be diluted to any required viscosity by the addition of more water. This dilution was accompanied by an increase in the pot life of the composition.

These correlations are illustrated in the following Table:

| Dilution with water | Solids content | Flow time DIN 4 cup | Pot life |
| --- | --- | --- | --- |
| None | 72% | 180 secs. | Approx. 2 hours |
| 6.7% | 67% | 105 secs. | Approx. 2.5 hours |
| 13.3% | 63% | 50 secs. | Approx. 4 hours |
| 20.0% | 60% | 24 secs. | Approx. 5 hours |

Bubble-free coatings having a dry film thickness of up to 400 μm were be produced without difficulty from these coating compounds.

Substantially similar results were obtained using polyisocyanate preparations B1 and B3 to B1 in equivalent quantities to the quantity of B2 set forth above.

EXAMPLE 2

A coating composition corresponding to Example 1, except that 22.6 parts by weight of polyether polyol A2 were used instead of the 26.7 parts by weight of polyether polyol A1.

EXAMPLE 3

A coating composition corresponding to Example 1, except that 21.1 parts by weight of polyether polyol A3 were used instead of the 26.7 parts by weight of polyether polyol A1.

EXAMPLE 4

A coating composition corresponding to Example 1, except that 34.5 parts by weight of polyisocyanate resin B1 were used instead of the 33.3 parts by weight of polyisocyanate resin B2.

The coating compositions of Examples 2 to 4 each had a pot life at room temperature of approximately 4 h and were used to prepare foam-free coatings with very good film properties.

To test the resistance to water of the coatings produced from coating compositions 1 to 4, cement mortar test specimens measuring 8×14 cm were coated with three layers of the compositions in accordance with DIN 52 617. The first layer was applied as a heavily diluted deep primer (solids content 36% while the following two top coats were applied in undiluted form. The dry film thickness of the cured coatings was 150 μm. After storage for 10 days at room temperature, the test specimens were contacted with water by continuous wetting of the coated test area of 112 cm². The increase in weight produced by the absorption of water was determined by weighing as a function of time. The water absorption can be calculated from these results in g/m² test area. The results are set forth in the following Table:

| Example | Water absorption (g/m²) after | | | |
| --- | --- | --- | --- | --- |
| | 1 h | 4 h | 8 h | 24 h |
| 1 | 35.7 | 35.7 | 53.6 | 62.5 |
| 2 | 26.8 | 35.7 | 44.6 | 62.5 |
| 3 | 26.8 | 26.8 | 44.6 | 53.6 |
| 4 | 33.5 | 34.8 | 46.1 | 54.9 |
| Comparison (uncoated) | 937 | 1116 | 1268 | 1393 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous coating composition comprising
   A) 100 parts by weight of a water-soluble polyether component having an average hydroxyl functionality of least 2.5 and an average OH number of 100 to 600 and containing at least one polyether polyol,
   B) 40 to 240 parts by weight of a water-soluble or water-dispersible polyisocyanate component containing at least one nonionically/hydrophilically modified organic polyisocyanate having (cyclo)aliphatically bound isocyanate groups,
   C) 10 to 50 parts by weight of magnesium oxide and/or hydroxide in finely dispersed form and
   D) 50 to 150 parts by weight water.

2. A mineral substrate which is coated with the coating composition of claim 1.

3. The aqueous coating composition of claim 1 wherein component B) comprises a member selected from the group consisting of the reaction product of i) a monohydric or polyhydric polyalkylene ether alcohol containing at least one polyether chain bearing at least 10 ethylene oxide units with ii) an isocyanurate-modified polyisocyanate prepared from a monomeric diisocyanate, a uretdione-modified polyisocyanate prepared from a monomeric diisocyanate; a urethane and/or alphanate-modified polyisocyanate prepared from a monomeric diisocyanate, a biuret-modified polyisocyanate prepared from 1,6-diisocyanatohexane and bis-(6-isocyanatohexyl)-oxadiazine trione.

4. The aqueous coating composition of claim 3 wherein said polyalkylene ether alcohol is monohydric.

5. The aqueous coating composition of claim 1 wherein component C) is present in an amount of 20 to 30 parts by weight.

6. The aqueous coating composition of claim 3 wherein component C) is present in an amount of 20 to 30 parts by weight.

7. The aqueous coating composition of claim 4 wherein component C) is present in an amount of 20 to 30 parts by weight.

8. An aqueous coating composition comprising
   A) 100 parts by weight of a water-soluble polyether component having an average hydroxyl functionality of at least 2.5 and an average OH number of 100 to 600 and containing at least one polyether polyol,
   B) 100 to 200 parts by weight of a water-soluble or water-dispersible polyisocyanate component containing at least one nonionically/hydrophically modified organic polyisocyanate having (cyclo)aliphatically bound isocyanate groups, C) 10 to 50 parts by weight of magnesium oxide and/or hydroxide in finely dispersed form and D) 50 to 150 parts by weight water.

9. The aqueous coating composition of claim 8 wherein component B) comprises a member selected from the group consisting of the reaction product of i) a monohydric or polyhydric polyalkylene ether alcohol containing at least one polyether chain bearing at least 10 ethylene oxide units with ii) an isocyanurate-modified polyisocyanate prepared from a monomeric diisocyanate; a uretdione-modified polyisocyanate prepared from a monomeric diisocyanate, a urethane and/or allophanate-modified polyisocyanate prepared from a monomeric diisocyanate, a biuret-modified polyisocyanate prepared from 1,6-diisocyanatohexane and bis-(6-isocyanatohexyl)-oxadiazine trione.

10. The aqueous coating composition of claim 9 wherein said polyalkylene ether alcohol is monohydric.

11. The aqueous coating composition of claim 8 wherein component C) is present in an amount of 20 to 30 parts by weight.

12. The aqueous coating composition of claim 9 wherein component C) is present in an amount of 20 to 30 parts by weight.

13. The aqueous coating composition of claim 10 wherein component C) is present in an amount of 20 to 30 parts by weight.

* * * * *